W. J. DAVIS.
HOLDER.
APPLICATION FILED AUG. 6, 1917.

1,303,864.

Patented May 20, 1919.
6 SHEETS—SHEET 5.

Witnesses:
Harry R. Pelute
W. P. Kilroy

Inventor:
William J. Davis,
By John How~~~~ J. McElroy
his Atty.

W. J. DAVIS.
HOLDER.
APPLICATION FILED AUG. 6, 1917.

1,303,864.

Patented May 20, 1919.
6 SHEETS—SHEET 6.

Witnesses
Harry R. L. White
W. F. Kilroy

Inventor
William J. Davis,
By John Howard McElroy
his Atty.

UNITED STATES PATENT OFFICE.

WILLIAM J. DAVIS, OF CHICAGO, ILLINOIS.

HOLDER.

1,303,864.   Specification of Letters Patent.   Patented May 20, 1919.

Application filed August 6, 1917. Serial No. 184,553.

*To all whom it may concern:*

Be it known that I, WILLIAM J. DAVIS, a citizen of the United States, and a resident of Chicago, in the county of Cook and State of Illinois, have invented certain new and useful Improvements in Holders, of which the following is a full, clear, and exact specification.

My invention is concerned with holders for pasteurizers having the same general mode of operation as that shown in my Patent No. 1,107,765, dated August 18, 1914, but is of a radically different type that is designed to be superior to the type of the aforesaid patent in that it is simpler in construction and occupies much less floor space. It is also superior in that the milk is held hermetically sealed, without any air in contact with it, during the holding operation. It is furthermore superior in that it provides a receptacle with an agitator therein into which the milk from each compartment of the holder is discharged, so that by the action of the agitator, the milk which may have become somewhat stratified in the holder is discharged into the filler in a continuous stream of uniform quality. It is furthermore superior in that the temperature-controlling fluid surrounding the holding tanks is kept constantly agitated so that it maintains a uniform temperature about all portions of all of the holding tanks.

To secure these desired novel results and modes of operation, my invention is embodied in certain novel combinations of elements, all of which will be fully described, and the novelty thereof defined in the claims.

To illustrate my invention, I annex hereto six sheets of drawings, in which the same reference characters are used to designate identical parts in all the figures, of which.

Figures 1, 13, 14, 15:
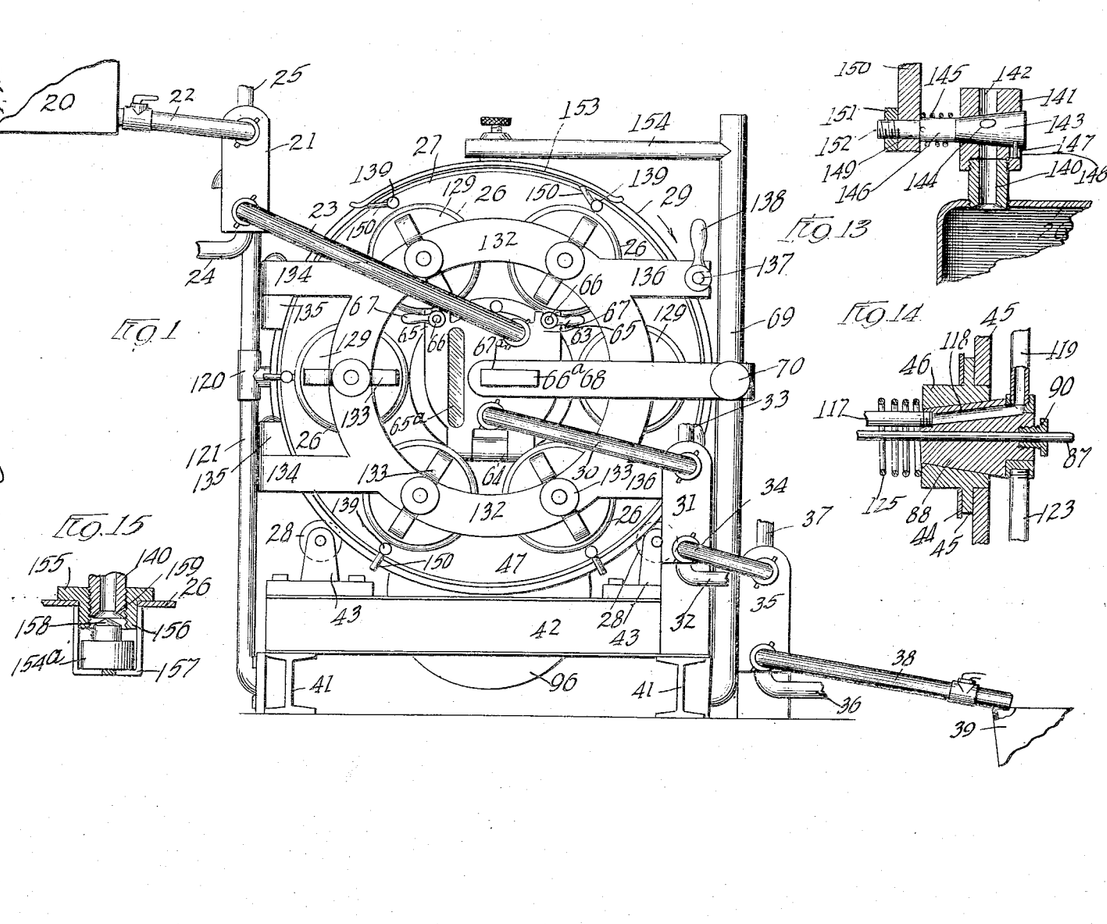
Figure 1 is an end elevation, somewhat diagrammatic in character, showing my invention as included in a complete pasteurizing outfit.
Fig. 13, Sheet 1, is an enlarged detail showing one of the automatic air-vent valves in section.
Fig. 14 is a detail in section on the line 14—14 of Fig. 3.
Fig. 15 is a detail in section of a valve.
Figure 6:
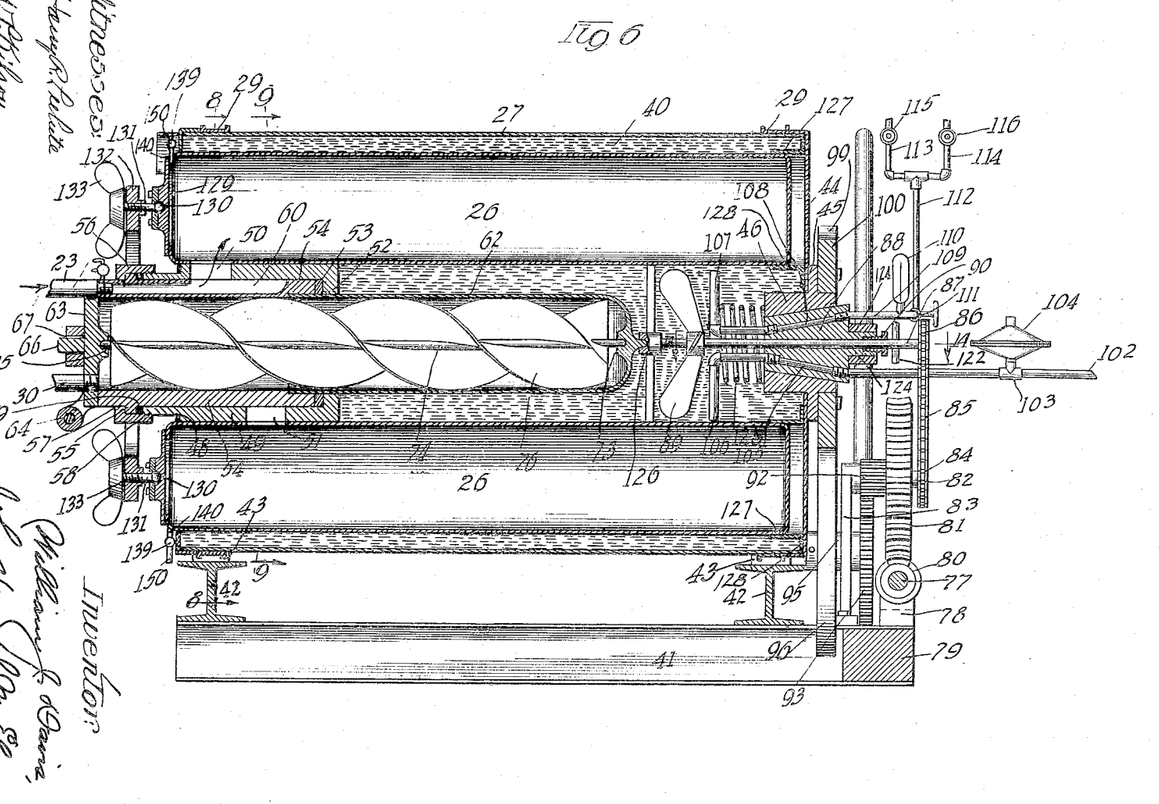
Fig. 6 is a central longitudinal section substantially on the line 6—6 of Fig. 2.

Referring first to Figs. 1 and 6, I will describe the general construction and mode of operation of the complete outfit, before attempting to describe the details of the holder. The milk to be pasteurized is emptied into a receiving tank 20, which is preferably located at some height above the pasteurizer proper, 21, indicated diagrammatically in Fig. 1, which may be of any desired form, such for instance as that shown in my application No. 657,002, filed October 26, 1911, and the milk flowing from the tank 20 passes by gravity through the pipe 22 into the receiving end of the pasteurizer 21, and emerges therefrom through the pipe 23 at the lower end thereof. The pipes 24 and 25 are the supply and exit pipes, respectively, for the hot water which is employed in bringing the milk passing through the pasteurizer 21 up to the desired pasteurizing temperature. The pipe 23 opens into the passage by which the milk is successively delivered to each one of the six or more or less holding tanks 26, which are grouped about a common center, and are in turn surrounded by the water jacket or temperature-retaining fluid tank 27, which is supported at both ends upon the pair of rollers 28 which coöperate with the annular tracks 29 secured on the ends of the tanks 27 at the peripheries thereof. A suitable gearing, to be described, is provided by which the tank 27, with its holding tanks rigidly secured therein, is rotated intermittently through short periods of time, at five-minute intervals say, through an angle of sixty degrees, and the tank 26 at the uppermost left-hand position shown in Fig. 1, in this position is emptied, through the connections to be explained, into the pipe 30 which leads to the cooler 31, which may be of the same construction as the pasteurizer 21, except that the pipe 32 supplying water thereto is furnished with cold water, which cold water, heated by the passage through the cooler of the hot milk, emerges from the pipe 33 much warmer. The partially cooled milk emerging from the cooler 31 passes through the pipe 34 to the cooler 35, which may be, and preferably is, of the same construction as the pasteurizer 21 and the cooler 31 except that its supply pipe 36 is supplied with ice-cold brine, which, considerably heated, emerges from the discharge pipe 37. The now pasteurized and cooled milk passes from the cooler 35 through the pipe 38 into the tank 39 of the filling machine for the bottles in which pasteurized milk is customarily dispensed. The milk passing from the pasteurizer 21 through the pipe 23 discharges, through connections to be described, into the holding tank 26 which is in the uppermost right-hand position seen in Fig. 1, at the same time that the tank immediately to the left is discharging in the manner just described. The four intermediate tanks, during the emptying and filling process of the two upper tanks are full of hot milk which is maintained at the desired temperature by the water 40 in the tank 27, and as the tank 27 is thus moved through sixty degrees at five-minute, for example, intervals, the milk in passing through the holder, during a period of approximately thirty minutes, is held at the desired holding temperature, after which it is discharged in the manner above described, each of the six tanks being first filled in the upper right-hand position seen in Fig. 1, after which it descends and stays for approximately five minutes in the central right-hand position, after which it descends and stands for approximately another five minutes at the lower right-hand position, where it stands for approximately five minutes, and then passes to the lower left-hand position, and so on, until it reaches the uppermost left-hand position, where it is emptied.

Having thus, to facilitate the understanding of the details of the apparatus, completed the general explanation, I will describe the details as follows:

The holding apparatus is mounted upon a suitable base, such for instance as is formed by the pair of longitudinal I beams 41, upon which are secured at their upper ends the transverse I beams 42, the supporting brackets 43 for the anti-friction rollers 28 being secured on the ends of the I beams 42.

Figure 7:
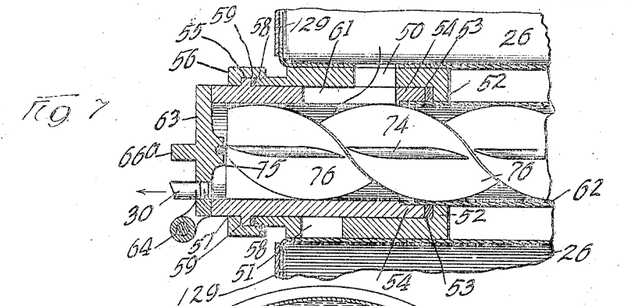
Fig. 7 is a view similar to a portion of Fig. 6, but on a different section, line 7—7, of Fig. 2.
Figure 8:
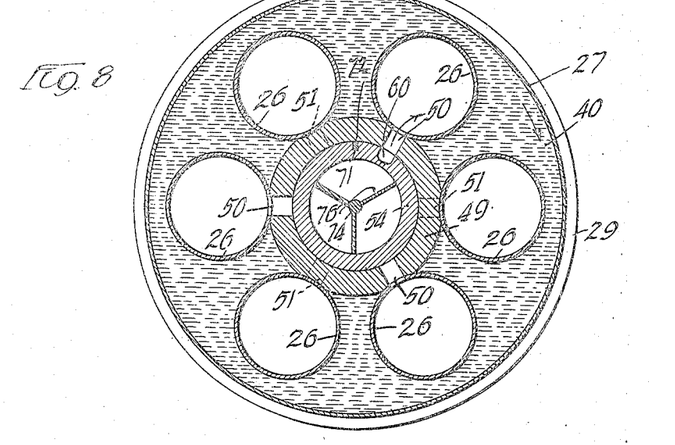
Figs. 8 and 9 are vertical sections on the lines 8—8 and 9—9, respectively, of Fig. 6.
Figure 9:
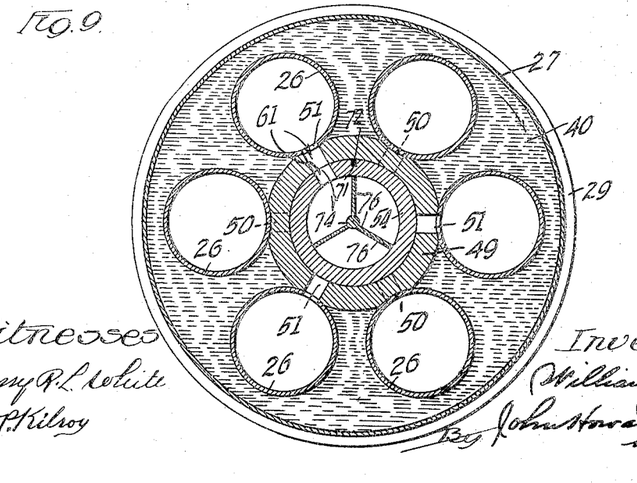
Figure 10:
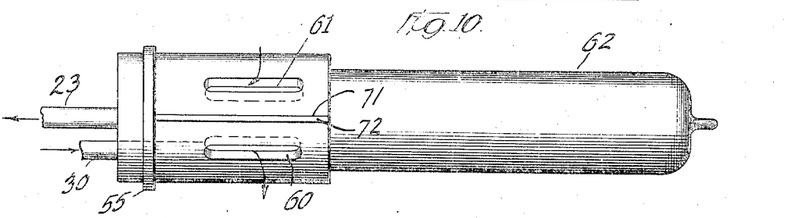
Fig. 10, Sheet 4, is a top plan view, detached, of the stationary tank into which the milk is discharged out of the holding tank.
Figure 11:
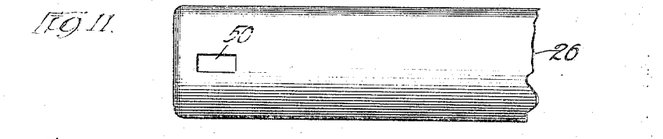
Figs. 11 and 12 are plan views, seen from the center of the apparatus, of two of the holding tanks, detached, showing the different locations of the filling and discharge apertures.
Figure 12:
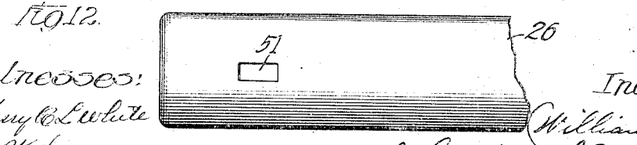

The tank 27 for the holding fluid is of a cylindrical construction, formed of heavy sheet-metal, and the driving end is closed by the annular plate 44, which is riveted or otherwise suitably secured to the annular flange 45 of the bearing sleeve 46. The other end of the tank 27 is closed by the head 47, which is also annular in its outline, except that it has seven circular openings therein through which the ends of the holding tanks 26 pass. The inner edge of this generally annular end 47 is secured to the annular shoulder 48 formed on the bearing sleeve 49, which bearing sleeve is elongated, as seen in Fig. 6, and has the adjacent sides of the holding tanks 26 at the ends secured thereto, and passages 50 and 51 are provided through said tanks and bearing sleeve 49 for the passage of the milk into and out of the tanks 26 during the filling and emptying operations. As best seen in Figs. 11 and 12, the alternate tanks 26 have the passages 50 and 51 in different planes, this arrangement being provided to facilitate the preventing of leakage from the tank that may be emptying to the one that is filling, or vice versa. The rotating bearing sleeve 49 has the inwardly projecting flange 52 at its inner end, and an annular packing ring 53 is interposed between this flange and the end of the stationary bearing sleeve 54. An annular flange 55 projects outwardly near the other end of the stationary sleeve 54, and a ring 56 having an inwardly projecting flange 57 coöperates with the flange 55, and by means of the threads on the interior of its inner end coöperating with the reduced threaded portion 58 of the rotating bearing sleeve 49 compresses the packing ring 59 between the flange 55 and the adjacent end of the rotating bearing sleeve 49 to make a liquid-tight joint at that end. The pipe 23 is threaded into the outer end of the stationary bearing sleeve 54 so as to open into the elongated port 60 formed in the upper face of the sleeve 54, so that as the apertures 50 and 51 of the sleeve 26 come into register therewith when they reach the filling position seen at the upper right-hand end in Fig. 1, the hot milk from the pasteurizer flows up into and fills the tank 26 which has been emptied at the previous stop. The stationary bearing sleeve 54 is, as best seen in Fig. 7, provided with another port 61 extending entirely through it, so that the milk in the discharging position of the tank 26 can flow therefrom through the port 50 or 51, as the case may be, in the rotating bearing sleeve 49, into the tank 62, which is partially formed by the interior of the stationary sleeve 54 and by the sheet-metal cylindrical extension thereof seen in Fig. 6. The inner end of the tank 62 is permanently closed, while the outer end is provided with a door 63 which is hinged at 64 to the outer end of the bearing sleeve 54, and is provided at its upper end with the slotted ears 65, which coöperate with the bolts 66 and wing nuts 67, so that the door 63 can be clamped tightly to the end of the sleeve 54 to make a liquid-tight joint. The face of the door 63 is preferably provided with a sight glass 65, so that the amount of milk in the receiving tank 62 may be observed, and it is also provided with the elongated, horizontally extending lug 66, which coöperates with the correspondingly shaped slot 67 in the horizontal bar 68, the outer end of which is pivotally secured to the post 69 extending upward from that end of the frame. The pivotal connection between the bar 68 and its supporting post 69 is necessary to permit the doors to the holders 26 to be opened for cleaning purposes, as indicated in Fig. 4, and as described later. A set screw 70 passed through the socket of the bar 68 and coöperating with the post 69 serves to hold the bar in any desired position of adjustment. To prevent possible leakage from the aperture or channel 60 to the channel 61, or vice versa, I provide between said apertures, in the top of the stationary sleeve 54, a longitudinal groove 71, in which is inserted a packing 72 which coöperates with the interior of the rotating bearing sleeve 49, in a manner which will be readily understood, to prevent the aforesaid leakage.

As a means for mixing the contents of each of the holding tanks 26 as they are discharged into the emptying tank 62, and to standardize the same and destroy the effects of the stratification which tends to occur in the holders 26 between the time they are filled and emptied, I form in the inner end of the tank 62 a bearing 73 for a horizontal shaft 74, the other end of which is mounted in a bearing 75 formed at the center of the inner face of the door 63. Secured on this shaft 74 are the light helical vanes or blades 76, which are struck by the milk falling into the tank 62 through the aperture 61 in such a manner as to cause the vanes to rotate and thus thoroughly stir up and mix the contents of the tank 62.

To rotate the tank 27 and its inclosed holding tanks 26 at the proper intervals, I employ the following gearing. A shaft 77, preferably driven by a motor, and mounted in suitable bearings 78 supported on the base piece 79 connecting the ends of the I beams 41, is provided with the worm 80, which meshes with the worm gear 81 mounted to rotate on the stub shaft 82 supported at the upper end of the vertical bearing bracket 83. Secured on the outer end of the hub of this worm gear 81 is a sprocket pinion 84, which is connected by the sprocket chain 85 with a sprocket wheel 86 secured on the outer end of the horizontal shaft 87 journaled in a bearing formed in the preferably tapered bearing cylinder 88, which is supported in a manner to be described, and upon which the bearing sleeve 46 previously mentioned rotates. The inner end of this shaft 87 is provided with a set of inclined blades 89, which, constantly rotating in the water found in all the space inside of the tank 27 except that occupied by the cylinders 26 and 62, serves to create a constant circulation of the heated water within the tank, thus insuring its being of the same temperature throughout said tank. A packing gland 90 is employed about the outer end of the shaft 87 where it enters the bearing 88, to prevent leakage of water through said bearing.

The worm gear 81 has on the inner portion of its hub a spur gear pinion 92 which meshes with a spur gear wheel 93 secured on a short shaft 94 journaled in a bearing 95 in the bracket 83. Secured on the inner end of the shaft 94 is the driving disk 96 of a Geneva stop type, which I have illustrated conventionally as provided with the carrying tooth 97 and the locking periphery 98, the locking periphery 98 coöperating with the six correspondingly concaved locking faces 99 on the Geneva stop driven disk 100, while the driving tooth 97 coöperates with the six notches 101 in said driven disk 100 between the locking surfaces 99, the driven disk 100 being rigidly secured on the bearing sleeve 46, so that during a portion of the time that it takes for the disk 96 to be given a complete rotation, the disk 100, and consequently the drum 27 and the holders 26 are rotated through sixty degrees to bring a fresh pair of the holding tanks 26 to the emptying and filling positions. During the intermediate times, the locking surfaces 98 and 99 coöperating serve to hold the drum locked in its position with the apertures 50 and 51 in perfect register with the apertures 60 and 61. While I have shown a conventional form of Geneva stop locking and driving disk, it will be understood that other more up-to-date forms may be employed.

Figure 3:
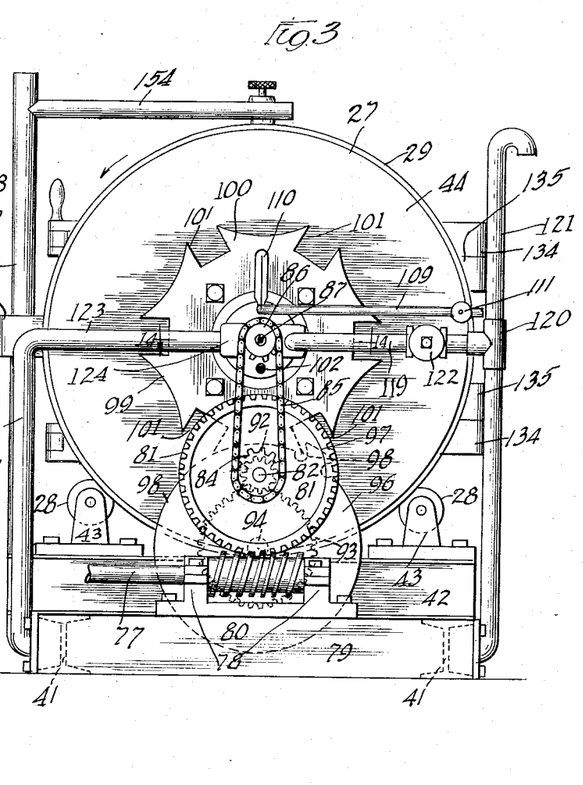
Fig. 3 is a similar view of the other end of the holder.
Figure 4:
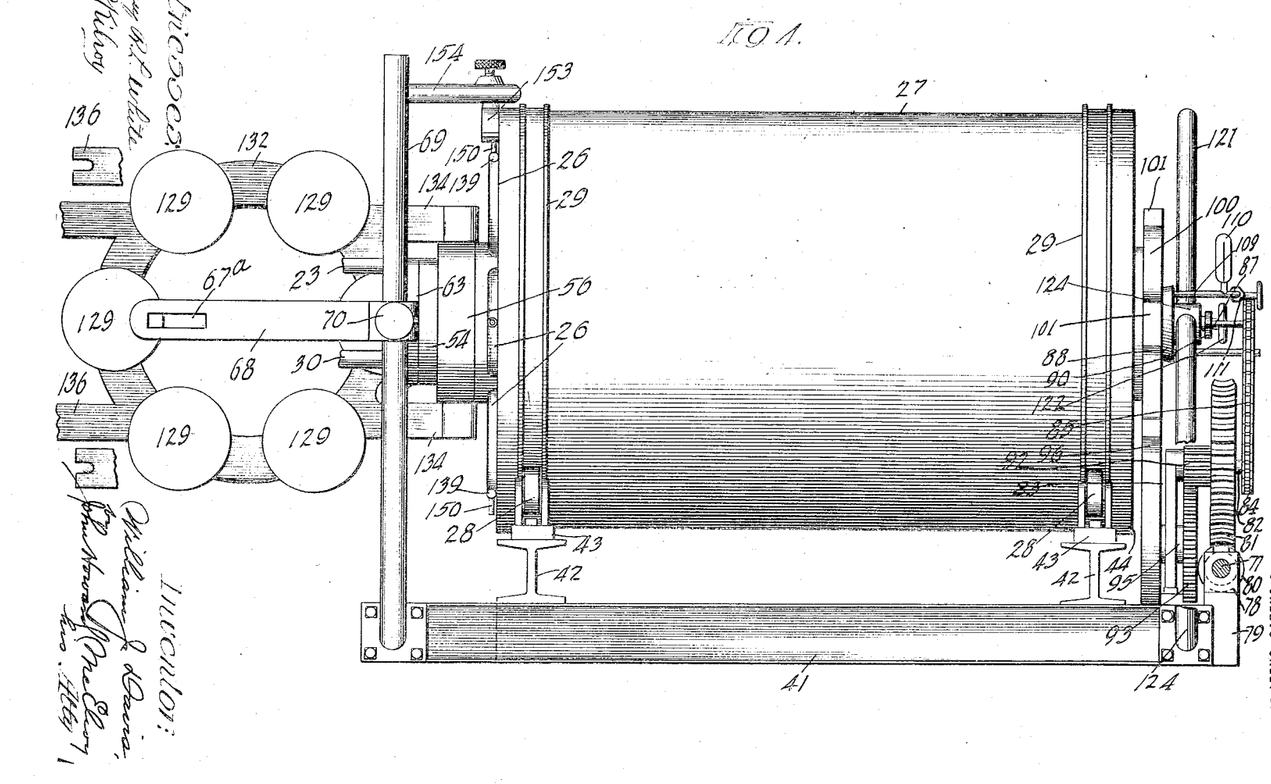
Fig. 4 is a side elevation of the same, with the door by which it is cleaned shown in an open position.
Figure 5:
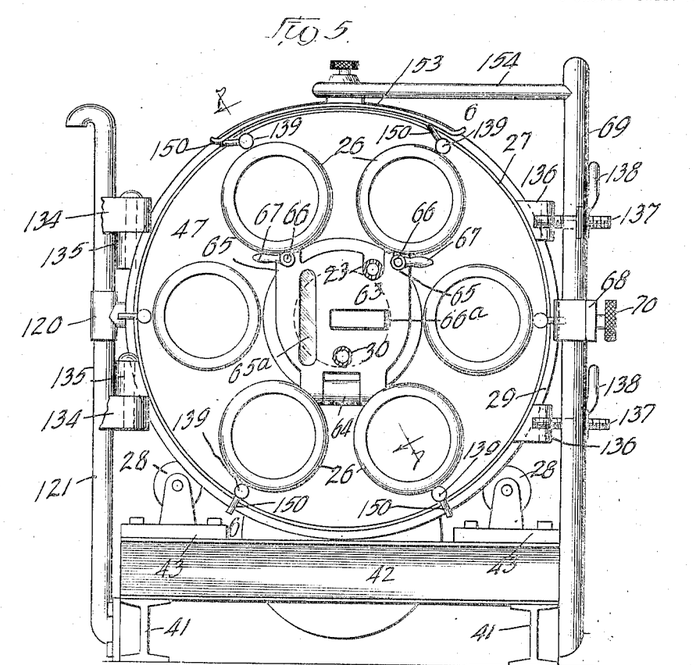
Fig. 5 is an end elevation similar to Fig. 2, but with the door for cleaning removed.

To keep the water in the drum 27 at the desired temperature, I provide a supply of live steam entering through the pipe 102, and passing the valve 103 that is controlled by a steam regulator 104, which will be controlled by a suitable thermostat device, not shown, coöperating with the heated water in the interior of the drum 27. The pipe 102 has its inner end threaded into the bearing cylinder 88, and is connected by the passage 105 through the cylinder 88 with the steam-supply pipe 106, which preferably takes the form of an angle. A similar pipe 107, preferably diametrically opposed to the pipe 106, is likewise threaded into the bearing 88 and connected by the passage 108 therethrough with the pipe 109 threaded into the outer end of the bearing 88, and which may be provided with a thermometer 110 to indicate the temperature of the steam or water supplied thereto. The pipe 109 can be opened and closed by the valve 111 therein, and beyond this valve 111 is connected with another pipe 112 which is connected by a T with a pair of pipes 113 and 114 controlled by the valves 115 and 116, which pipes are connected with a source of steam and water, so that the drum 27 can be filled and heated at the beginning of a run. To provide for overflow of the water of condensation resulting from the steam that enters the tank through the pipe 102 to keep up the temperature, I provide still another angular pipe 117, seen in Fig. 14, preferably located half way between the pipes 106 and 107, and also threaded into the inner end of the bearing 88, and connected by the passage 118 therethrough with the horizontal pipe 119, which, as seen in Fig. 3, is connected by the T 120 with the vertical overflow pipe 121. A valve 122 can be employed to open and close the pipe 119, which, together with the pipe or rod 123, screwed into the opposite side of the block 124 secured to or formed integral with the outer face of the bearing 88, serves to prevent the rotation of the latter. The pipe or rod 123 is connected to the vertical rod 124 secured to and projecting upward from the base of the apparatus.

To keep the conical bearing surfaces of the bearing 88 and the coöperating sleeve 46 in contact in spite of the wear which occurs, I preferably interpose the strong helically coiled expanding spring 125, which is preferably constructed of brass or otherwise plated so as not to corrode, between the vertical portions of the pipes 106, 107 and 117 and the inner face of the sleeve 47. A spider 126 placed in the drum 27, and extending to the periphery thereof between the cylinders 26, serves to support the inner end of the cylinder 62.

Figure 2:
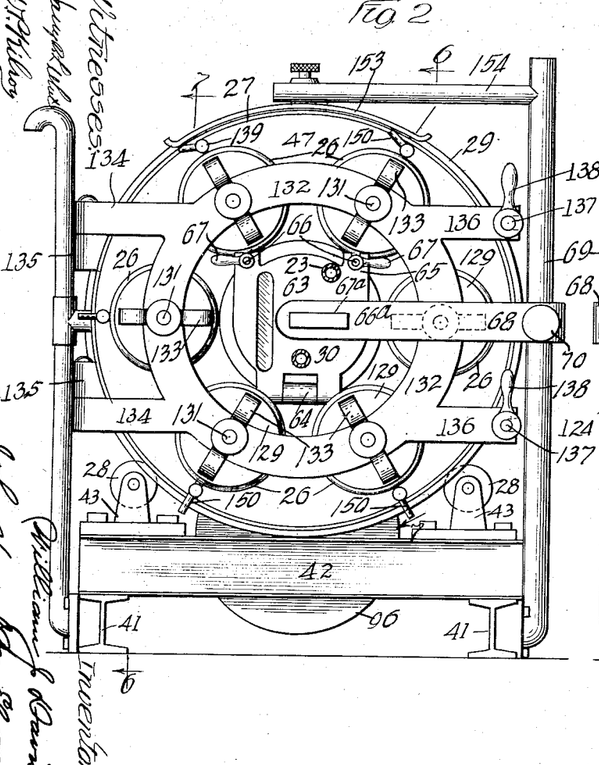
Fig. 2 is an end elevation of one end of the holder.

The inner ends of the holding tanks or cylinders 26 are suitably secured between the annular flanges 127 and 128 on the inner face of the end 44 of the drum, and it will be understood that the interiors of these holders 26 are smooth with rounded corners, and preferably lined with enamel or some non-absorbent material, so that they can be readily cleaned, when, after the day's run, the doors 129 which close the ends of the holding tanks are opened. These doors are preferably connected by the ball-and-socket joints 130 with the inner ends of the screw bolts 131, which are threaded through the ring 132 and provided on their outer ends with the wings 133 by which they can be manipulated. Assuming that the ring 132 is held rigidly in the position shown in Fig. 6, it will be understood that by manipulating the bolt 131, the door 129 can be closed down as tightly upon the end of the cylinder or tank 26 as may be necessary to make the same liquid-tight, the ball-and-socket bearing allowing the same to move to the necessary angle to secure a complete contact between the adjacent ground faces of the end of the tank 26 and the door 129. As best seen in Fig. 2, the ring or annulus 132 is provided with the hinge bearings 134 which coöperate with the hinge bearings 135 supported from that side of the end of the drum 27, and, on the opposite side, the ring 132 has the arms 136 which have the slotted ends coöperating with the bolts 137 and the nuts 138 threaded thereon by which the ring 132 can be clamped in any desired position, it being understood that the bolts 137 are suitably supported from that side of the drum 27.

As the holding tanks 26 between the filling and emptying are full of milk, it becomes necessary to provide some means for opening the same at the tops to permit the entrance of the air as they are being emptied and to permit its escape while they are being filled, and for this purpose I provide each of these holding tanks 26 with a valve 139, such as is illustrated in detail in Fig. 13, where it will be seen that the end of each of the tanks 26 is connected by a short pipe 140 with the valve casing 141, which has the passage 142 extending therethrough in line with the interior of the pipe 140. A tapered valve-seat is provided in the casing 141, and a tapered valve 143, with the port 144 passing therethrough, is held by the helically coiled torsion spring 145 surrounding the portion 146 of the valve, and having one end connected to said valve and the other end to the casing 141, so that the torsion of the spring holds the valve normally in the position indicated in Fig. 13, the limit of its movement being controlled by the pin 147 therein coöperating with the face 148 of a recess in the block. The expanding action of the spring 145 serves to hold the valve 143 tightly seated in its bearing in the block 141. A squared reduced portion 149 of the valve member serves to secure rigidly thereon the arm 150, the nut 151 screwed on the threaded extreme end 152 of the valve member coöperating with the arm 150. A cam plate 153 supported from the horizontal arm 154 connected to the top of the post 69 coöperate with the arms 150 to open the valve automatically just before its associated holding tank reaches the discharging position, and to hold it open until just after it leaves the filling position.

The general use of the apparatus will be readily understood from the description heretofore given, and it will be understood that when the day's run is completed, and it is desired to clean the apparatus, the first thing to do is to fill the tank 20 with a cleansing fluid of any desired strength and to run this through the machine in the same manner as milk. After this cleansing fluid, cold water, warmer water, and finally steam, can then be run through the machine, and after this is done, the pipes 23 and 30 will be disconnected from the ports 60 and the door 63, respectively, and the bar 68 will be swung away, after which the door 69 can be opened and the ring 132 swung away, thus giving access to the interior of the tanks 26 and 62. When the door 63 is opened, the shaft 74 and the associated vanes 76 can be pulled out, leaving all the working parts sufficiently exposed so that they can be readily further cleaned by scrubbing in the customary manner.

As a further safeguard, to prevent the possibility of more milk flowing into the tank 26 during the interval of rest, than their capacity (which might result from irregularity of supply from the pasteurizing coil 21), and the possibility of the excess of milk flowing out through the passage 142 while the valve 139 is held open by the flange 153, I preferably employ in addition the floating check-valve 154, seen in Fig. 15, where it will be seen that I thread the end of the pipe 140 into the socket 155, secured liquid tight in the tank 26. A flange 156 extends below the inner surface of the tank, and a spider-like cage 157, preferably constructed of spring metal, is secured on a flange and holds the hollow float valve 154 in place with its conical contact surface 158 below the conical valve seat 159, when the tank is filling or emptying, so as to permit the free passage of the air escaping or entering, as the case may be. When the tank is filled, the milk lifts the valve 154 to close the passage and as the milk cannot escape from the tank, it simply backs up in the passages 21 and receiving tank 20, until a fresh tank is brought into filling position.

While I have shown and described my invention as embodied in the forms which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a device of the class described, the combination with a temperature-retaining fluid holder, of a plurality of holding tanks therein, and connections whereby said tanks can be successively filled absolutely full, then hermetically sealed and held so sealed for the desired interval of time while other tanks are being filled and emptied, and finally emptied, substantially as described.

2. In a device of the class described, the combination with a temperature-retaining fluid holder, of a plurality of holding tanks therein, means for rotating the holding tanks about a common center, means for filling said holding tanks in a certain position and emptying them in another position after an interval, means for supplying temperature-retaining fluid to the holder, and an agitator in said holder to cause a forced circulation of the temperature-retaining fluid therein to insure a uniform temperature of the tanks in all positions of the holder.

3. In a device of the class described, the combination with a temperature-retaining fluid holder, of a plurality of holding tanks therein, means for rotating the holder and the contained tanks about a common center, means for filling said holding tanks in one position and emptying them in another after an interval, means for supplying temperature-retaining fluid to said holder, and a rotating agitator journaled in a stationary bearing at the center of the holder to cause a forced circulation of the temperature-retaining fluid therein to insure a uniform temperature of the tanks in all positions they occupy in the holder.

4. In a device of the class described, the combination with a temperature-retaining fluid holder, of a plurality of holding tanks therein, means for filling said holding tanks and emptying them after an interval, a receptacle into which the holding tanks successively discharge and from which the milk is delivered for further treatment, and an agitator in said receptacle operating to standardize the milk passing therethrough.

5. In a device of the class described, the combination with a temperature-retaining fluid holder, of a plurality of holding tanks mounted to rotate therein about a common center, means for filling said holding tanks in one position and emptying them in another after an interval, a receptacle into which the holding tanks successively discharge and from which the milk is delivered for further treatment, and an agitator in said receptacle operating to standardize the milk passing therethrough.

6. In a device of the class described, the combination with a temperature-retaining-fluid holder, of a plurality of holding tanks mounted to rotate therein about a common center, means for filling said holding tanks in one position and emptying them in another after an interval, means for rotating the holder and the contained tanks, a receptacle into which the holding tanks successively discharge and from which the milk is delivered for further treatment, and an agitator in said receptacle operating to standardize the milk passing therethrough.

7. In a device of the class described, the combination with a temperature-retaining fluid holder, of a plurality of holding tanks mounted to rotate therein about a common center, means for filling said holding tanks in one position and emptying them in another after an interval, a stationary receptacle in the center of the temperature-retaining fluid holder and surrounded by the tanks which successively discharge therein and from which the milk is delivered for further treatment, and an agitator in said receptacle operating to standardize the milk passing therethrough.

8. In a device of the class described, the combination with a temperature-retaining fluid holder, of a plurality of holding tanks therein, means for rotating said tanks and holder about a common axis, and connections to said tanks so that they can be *seriatim* filled and emptied after a suitable interval.

9. In a device of the class described, the combination with a temperature-retaining fluid holder, of a plurality of holding tanks therein, means for rotating intermittently said tanks and holder about a common axis, and connections to said tanks so that they can be *seriatim* filled and emptied after a suitable interval during the periods they are at rest.

10. In a device of the class described, the combination with a temperature-retaining fluid holder, of a plurality of holding tanks therein, means for rotating said tanks and holder intermittently about a common axis, and connections to said tanks whereby one tank may be filled, an adjacent one emptied, and the intermediate ones kept full.

11. In a device of the class described, the combination with a temperature-retaining fluid holder, of a plurality of holding tanks therein, means for rotating said tanks and holder about a common axis, and connections to said tanks so that they can be *seriatim* filled and emptied after a suitable interval so that each tank of the series in its turn may be filled during one period, held filled during a plurality of other periods, and finally emptied during still another period.

12. In a device of the class described, the combination with a temperature-retaining fluid holder, of a plurality of holding tanks therein, means for rotating said tanks and holder about a common axis, connections to said tanks so that they can be *seriatim* filled and emptied after a suitable interval, and means for supplying the holder with temperature-retaining fluid.

13. In a device of the class described, the combination with a temperature-retaining fluid drum, of a plurality of cylindrical holding tanks therein arranged about a common horizontal axis at the center of the drum, a stationary cylindrical receptacle in the center of the holder, and connections to said tanks and receptacle so that they can be *seriatim* filled and emptied after a suitable interval into said receptacle.

14. In a device of the class described, the combination with a temperature-retaining fluid drum, of a plurality of cylindrical holding tanks therein arranged about a common horizontal axis at the center of the drum, a stationary cylindrical receptacle in the center of the drum, connections to said tanks and receptacle so that they can be *seriatim* filled and emptied after a suitable interval into said receptacle, and a screw agitator in said receptacle rotated by the milk being discharged thereinto.

15. In a device of the class described, the combination with a heating-fluid holder, of a plurality of hermetically sealed holding tanks therein, means for rotating said tanks and holder about a common axis, connections to said tanks so that they can be *seriatim* filled and emptied after a suitable interval, an air-vent cock for each tank, and means for holding the cocks open when the tanks are being filled and emptied, and closed between said operations.

16. In a device of the class described, the combination with a temperature-retaining fluid holder, of a plurality of holding tanks therein, connections to said tanks so that they can be *seriatim* filled and emptied after a suitable interval, an agitator for the temperature-retaining fluid in the holder, and means for rotating said tanks, holder and agitator about a common axis.

17. In a device of the class described, the combination with a temperature-retaining fluid holder, of a plurality of holding tanks therein, connections to said tanks so that they can be *seriatim* filled and emptied after a suitable interval, an agitator for the temperature-retaining fluid in the holder, and means for rotating said tanks and holder intermittently and the agitator continuously about the common axis.

18. In a device of the class described, the combination with a cylindrical temperature-retaining fluid drum, of a plurality of cylindrical holding tanks therein arranged about a common horizontal axis at the center of the drum, driving gearing at one end of the drum for rotating it and the contained tanks, and connections to said tanks at the other end of the drum so that they can be *seriatim* filled and emptied after a suitable interval.

19. In a device of the class described, the combination with a temperature-retaining fluid holder of a plurality of holding tanks therein, means for rotating said tanks and holder about a common axis, connections to said tanks so that they can be *seriatim* filled and emptied after a suitable interval, means for supplying the holder with temperature-retaining fluid, and an overflow pipe for any excess accumulation of the temperature-retaining fluid.

20. In a device of the class described, the combination with a cylindrical temperature-retaining fluid drum, of a plurality of cylindrical holding tanks therein arranged about a common horizontal axis at the center of the drum, means for rotating said drum and the contained tanks, connections to said tanks so that they can be *seriatim* filled and emptied after a suitable interval, and removable heads for said tanks at one end thereof.

21. In a device of the class described, the combination with a cylindrical temperature-retaining fluid drum, of a plurality of cylindrical holding tanks therein arranged about a common horizontal axis at the center of the fluid holder, means for rotating said drum and the contained tanks, a stationary cylindrical receptacle at the center of the drum, connections to said tanks so that they can be *seriatim* filled and emptied after a suitable interval into the receptacle, and connections whereby one head of the receptacle can be removed.

22. In a device of the class described, the combination with a cylindrical temperature-retaining fluid drum, of a plurality of cylindrical holding tanks therein arranged about a common horizontal axis at the center of the fluid holder, means for rotating said drum and the contained tanks, a stationary cylindrical receptacle at the center of the drum, connections to said tanks so that they can be *seriatim* filled and emptied after a suitable interval into the receptacle, and connections whereby the heads of said tanks and the receptacle at one end may be removed for cleansing purposes.

23. In a device of the class described, the combination with a temperature-retaining fluid drum, of a plurality of cylindrical holding tanks grouped therein about a common axis, means for rotating said drum and the inclosed tanks, a stationary cylindrical receptacle at the center of the drum, a sleeve surrounding one end of the stationary cylindrical receptacle, a filling port formed at one point on the periphery of the same, an emptying port passing through the sleeve at another point on the periphery, a head closing the stationary cylindrical receptacle and the sleeve, and a discharge pipe entering the closing head.

24. In a device of the class described, the combination with a temperature-retaining fluid drum, of a plurality of cylindrical holding tanks grouped therein about a common axis, means for rotating said drum and the inclosed tanks, a stationary cylindrical receptacle at the center of the drum, a sleeve surrounding one end of the stationary cylindrical receptacle, a filling port formed at one point on the periphery of the same, an emptying port passing through the sleeve at another point on the periphery, a head closing the stationary cylindrical receptacle and the sleeve, a discharge pipe entering the closing head, a bearing on the inner face of the closing head, an opposed bearing on the other end of the stationary cylindrical receptacle, a central shaft journaled in said bearing, and a screw blade on the shaft.

25. In a device of the class described, the combination with a temperature-retaining fluid drum, of a plurality of cylindrical holding tanks therein grouped about a common horizontal axis at the center of the drum, a bearing for one end of the drum, means for supplying heating fluid through the stationary part of said bearing, a second bearing for the other end of the drum, and means for supplying the fluid to be treated and discharging it through the stationary part of the bearing.

26. In a device of the class described, the combination with a plurality of holding tanks mounted to rotate about a common horizontal axis, a supply tank above the high point reached by the tanks, a discharge outlet, connections between said supply tank, holding tanks and outlet whereby each holding tank as it reaches the high part of its movement is first emptied into the outlet and then filled from the supply tank, and means for rotating the holding tanks.

27. In a device of the class described, the combination with a plurality of holding tanks mounted to rotate about a common horizontal axis, a supply tank above the high point reached by the tanks, a discharge outlet, connections between said supply tank, holding tanks and outlet whereby each holding tank as it reaches the high part of its movement is first emptied into the outlet and then filled from the supply tank, a heating-fluid holder surrounding the holding tanks, and means for rotating the holding tanks.

28. In a device of the class described, the combination with a plurality of holding tanks mounted to rotate about a common horizontal axis, a supply tank above the high point reached by the tanks, a discharge outlet, connections between said supply tank, holding tanks and outlet whereby each holding tank as it reaches the high part of its movement is first emptied into the outlet and then filled from the supply tank, a temperature-retaining fluid holder surrounding the holding tanks, and means for rotating the holding tanks and temperature-retaining fluid holder.

29. In a device of the class described, the combination with a plurality of holding tanks mounted to rotate about a common horizontal axis, a supply tank above the high point reached by the tanks, a discharge outlet, connections between said supply tank, holding tanks and outlet whereby each holding tank as it reaches the high part of its movement is first emptied into the outlet and then filled from the supply tank, and means for rotating the holding tanks, said connections holding the tanks hermetically sealed between the time they are filled and emptied.

30. In a device of the class described, the combination with a plurality of hermetically closed holding tanks mounted to rotate about a common horizontal axis, a supply tank above the high point reached by the holding tanks, a discharge outlet, connections between said supply tank, holding tanks and outlet whereby each holding tank as it reaches the high part of its movement is first emptied into the outlet and then filled from the supply tank, air valves in said holding tanks arranged to automatically open while they are being filled and emptied and to be held closed between said operations, and means for rotating the holding tanks.

31. In a device of the class described, the combination with a plurality of holding tanks mounted to rotate about a common horizontal axis, a supply tank above the high point reached by the holding tanks, a stationary central tank into which the milk is discharged *seriatim* from the holding tanks, an outlet from said central tank, connections between said supply tank, holding tanks, central tank and outlet, whereby each holding tank as it reaches the high point of its movement is first emptied into the central tank and then filled from the supply tank, and means for rotating the holding tanks.

32. In a device of the class described, the combination with a plurality of holding tanks mounted to rotate about a common horizontal axis, a supply tank above the high point reached by the holding tanks, a stationary central tank into which the milk is discharged *seriatim* from the holding tanks, an outlet from said central tank, connections between said supply tank, holding tanks, central tank and outlet, whereby each holding tank as it reaches the high point of its movement is first emptied into the central tank and then filled from the supply tank, an agitator in said stationary central tank, and means for rotating the holding tanks.

33. In a device of the class described, the combination with a plurality of holding tanks mounted to rotate about a common horizontal axis, a supply tank above the high point reached by the holding tanks, a stationary central tank into which the milk is discharged *seriatim* from the holding tanks, an outlet from said central tank, connections between said supply tank, holding tanks, central tank and outlet, whereby each holding tank as it reaches the high point of its movement is first emptied into the central tank and then filled from the supply tank, an agitator in said stationary central tank adapted to be kept in motion by the milk discharging into the stationary central tank, and means for rotating the holding tanks.

34. In a device of the class described, the combination with a horizontal cylindrical temperature-retaining fluid drum having annular tracks on its periphery near its ends, of a supporting frame, supporting rollers journaled in the frame and coöperating with the tracks, horizontal holding tanks arranged in the periphery of the drum, a supply tank, a discharge outlet, and connections between said supply tank, holding tanks and outlet, whereby each holding tank as it reaches the high point of its movement is first emptied into the outlet and then filled from the supply tank, and means for rotating the drum.

35. The combination with a plurality of holding tanks, of means for moving the same through a plurality of positions, a source of supply for the milk adapted to deliver the same under pressure to the holding tanks, connections between said source of supply and the holding tanks for first filling the latter, automatically closing the same hermetically when filled, holding the same full during an interval, and automatically unsealing and emptying the holding tanks.

36. The combination with a plurality of holding tanks, of means for moving the same through a plurality of positions, a source of supply for the milk adapted to deliver the same under pressure to the holding tanks, connections between said source of supply and the holding tanks for first filling the latter, automatically closing the same hermetically when filled, holding the same full during an interval, and automatically unsealing and emptying the holding tanks, said connections including a float valve in each of the holding tanks coöperating with an air passage to close the same when the tank is filled and to open it as it begins to empty.

In witness whereof I have hereunto set my hand and affixed my seal this 4th day of August, A. D. 1917.

WILLIAM J. DAVIS. [L. S.]

Witness:
JOHN HOWARD McELROY.